US007765553B2

(12) United States Patent
Douceur et al.

(10) Patent No.: US 7,765,553 B2
(45) Date of Patent: *Jul. 27, 2010

(54) METHOD AND SYSTEM FOR REGULATING BACKGROUND TASKS USING PERFORMANCE MEASUREMENTS

(75) Inventors: John R. Douceur, Bellevue, WA (US); William J. Bolosky, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1442 days.

This patent is subject to a terminal disclaimer.

(21) Appl. No.: 11/010,471

(22) Filed: Dec. 13, 2004

(65) Prior Publication Data

US 2005/0132375 A1    Jun. 16, 2005

Related U.S. Application Data

(63) Continuation of application No. 09/354,970, filed on Jul. 16, 1999, now Pat. No. 6,834,386.

(51) Int. Cl.
*G06F 9/46* (2006.01)
(52) U.S. Cl. .................. 718/107; 718/102; 718/103
(58) Field of Classification Search ............ 718/1, 718/8, 100, 102, 103, 107, 108
See application file for complete search history.

(56) References Cited

U.S. PATENT DOCUMENTS 5,285,389 A *   2/1994   Taylor .................. 701/51

| 5,408,663 A | 4/1995 | Miller ..................... 709/104 |
| 5,410,667 A | 4/1995 | Belsan et al. |
| 5,537,566 A | 7/1996 | Konno et al. ............... 711/114 |
| 5,542,088 A * | 7/1996 | Jennings et al. ............ 718/103 |

(Continued)

FOREIGN PATENT DOCUMENTS

EP    0 774 715 A1    5/1997

(Continued)

OTHER PUBLICATIONS

LaLonde, Ken, "Batch daemon-README", UNIX Batch Command, University of Toronto, pp. 1-3 (Feb. 27, 1997), ftp://ftp.cs.toronto.edu/pub/batch.tar.z printed Dec. 8, 2000.

(Continued)

*Primary Examiner*—Meng-Ai An
*Assistant Examiner*—Willy W Huaracha
(74) *Attorney, Agent, or Firm*—Workman Nydegger

(57) ABSTRACT

A method and system for regulating tasks of background processes so as to reduce interference with foreground processes. The progress rate of a background task (e.g., amount of work performed per unit time) is measured and evaluated against a target amount. If the progress rate appears degraded, the background task is suspended for a computed time interval so as to back off from its interference with a foreground process. Each time the progress rate appears degraded, the time interval is exponentially increased from its previous value up to a maximum, however if the performance appears normal, the time interval is reset to a minimum. Evaluation of the work is statistically based so as to eliminate variations in measurements, and automatic calibration of the target amount is provided, as is a mechanism for prioritizing multiple background tasks.

19 Claims, 8 Drawing Sheets

U.S. PATENT DOCUMENTS

| | | | |
|---|---|---|---|
| 5,706,510 | A | 1/1998 | Burgoon |
| 5,778,384 | A | 7/1998 | Provino et al. |
| 5,778,395 | A | 7/1998 | Whitting |
| 5,822,584 | A | 10/1998 | Thompson et al. .......... 709/103 |
| 5,907,673 | A | 5/1999 | Hirayama et al. |
| 5,918,229 | A | 6/1999 | Davis et al. |
| 5,938,723 | A | 8/1999 | Hales et al. |
| 5,949,762 | A | 9/1999 | Green et al. |
| 5,995,997 | A * | 11/1999 | Horvitz ...................... 718/102 |
| 6,005,575 | A | 12/1999 | Colleran |
| 6,018,759 | A | 1/2000 | Doing |
| 6,047,308 | A | 4/2000 | Grummer et al. |
| 6,058,489 | A | 5/2000 | Schultz et al. ................. 714/7 |
| 6,061,722 | A | 5/2000 | Lipa |
| 6,076,157 | A | 6/2000 | Borkenhagen |
| 6,098,090 | A | 8/2000 | Burns ........................ 709/107 |
| 6,101,194 | A | 8/2000 | Annapareddy et al. ...... 370/447 |
| 6,185,574 | B1 | 2/2001 | Howard et al. |
| 6,223,201 | B1 | 4/2001 | Reznak ....................... 709/102 |
| 6,243,736 | B1 * | 6/2001 | Diepstraten et al. ......... 718/108 |
| 6,567,839 | B1 | 5/2003 | Borkenhagen |
| 2003/0081011 | A1 * | 5/2003 | Sheldon et al. ............. 345/838 |
| 2005/0108716 | A1 | 5/2005 | Douceur |
| 2005/0166092 | A1 * | 7/2005 | Swoboda ..................... 714/30 |

FOREIGN PATENT DOCUMENTS

| | | |
|---|---|---|
| WO | WO 99/09480 | 2/1999 |
| WO | WO 99/12098 | 3/1999 |
| WO | WO 99/21082 | 4/1999 |

OTHER PUBLICATIONS

Steere et al., "A Feedback-driven Proportion Allocator for Real-Rate Scheduling", Third Symposium on Operation Systems Design and Implementation (OSDI '99)USENIX Association, pp. 145-158 (1999).

International Search Report from corresponding PCT Application No. PCT/USOO/18989 mailed Jan. 5, 2001.

Notice of Allowance dated Feb. 5, 2010 cited in U.S. Appl. No. 11/009,655.

Office Action dated Sep. 30, 2009 cited in U.S. Appl. No. 11/009,655.

* cited by examiner

METHOD AND SYSTEM FOR REGULATING BACKGROUND TASKS USING PERFORMANCE MEASUREMENTS

CROSS-REFERENCE TO RELATED APPLICATION

This is a continuation of U.S. patent application Ser. No. 09/354,970 filed Jul. 16, 1999.

TECHNICAL FIELD

The invention relates generally to computer systems, and more particularly to improving the operating performance of computer systems.

BACKGROUND OF THE INVENTION

Many computer systems execute background processes. The tasks of these processes are often directed to performing maintenance (housekeeping) functions, such as file compression, disk defragmentation, file-system content indexing and file archiving. While these tasks are relatively important to complete at some time, there is ordinarily no need to do so at any particular time. Thus, they are often run in the background, operating when no higher-priority foreground process, such as a process of an application program interacting with a user, is operating.

The traditional approach to operating a background process is to assign the process a priority level that is just above the system idle process, whereby CPU (central processing unit) cycles are allotted to the background process only when no normal priority process is ready to use the CPU. For example, in the Unix programming environment, the command "nice" initiates a process with reduced scheduling priority, which may be set as low as the system idle priority level.

Governing the execution of a process by priority scheduling of CPU cycles assumes that the CPU is the limiting resource. However, in many instances, the CPU is not the limiting resource, but instead, process performance may be limited by I/O (input/output) rate and/or contention for another system resource, such as the disk, processor cache, memory capacity and/or memory bandwidth. Since background processes contend for these resources, background processes interfere with higher priority foreground processes, and scheduling priority is insufficient as a mechanism for limiting this interference. The interference increases with background processes related to file-system maintenance activities, since such activities are resource intensive, but often use few CPU cycles.

By way of example, consider a background process that wants to access the same I/O resource (e.g., a disk) as a foreground process, wherein both processes are regularly performing I/O operations to the disk resource that take longer than the amount of time each process needs the CPU. When the foreground process is performing disk I/O operations, the background process is given some CPU cycles, during which time the background process desires access to the disk resource. As can be appreciated, the background process has to wait for completion of the I/O by the foreground process.

When the foreground process completes its I/O operation, the background process is given access to the disk and the foreground-process is given CPU cycles, during which time the foreground process again wants access to the disk resource. However, because the foreground process has to wait for access to the disk resource, the foreground process has to idle, and at that moment, the CPU is essentially not being used by either the foreground or background process. Accordingly, the CPU is not the limiting resource, but rather the disk is, i.e., contention for the disk resource by the background process causes the interference with the foreground process. Unless the background process is entirely halted, however, the background process will receive CPU cycles when the foreground process is performing I/O, and thus will continue to interfere with the foreground process because the background process also will request access to the disk resource during its allotted cycles.

A foreground application program's process that is of immediate consequence to a user is thus negatively impacted by (non-CPU) resource contention, unless the background process is canceled. However, simply canceling the background process defeats the many advantages of having a background process run, e.g., to perform useful work during the many times when the foreground process is not contending with the background process for the CPU or other resource.

SUMMARY OF THE INVENTION

Briefly, the present invention provides a method and system for limiting the interference of a background process with a foreground process. A background process is executed for a brief time slice. The actual performance of the background process is measured, and statistically analyzed to determine if the performance is degraded, operating normally, or if more information is needed. If the performance is degraded, the background process is likely interfering with the foreground process, whereby the background process is then suspended (backed off) for longer and longer time intervals between executions until either some acceptable limit is reached or until the performance of the background process no longer appears to be degraded, indicating that it is likely not interfering with another process. If normal performance is detected, the back-off time interval is reset to some predetermined minimum value. If normal performance is detected or more information is needed, the task will again receive authorization to perform work. Because the actual performance is dynamically measured for each execution period, contention for a resource other than the CPU is actively detected, enabling the background process to appropriately and quickly back off from interfering with the foreground process via device contention. A critical task may have the suspension time dynamically adjusted based on its relative importance such that it will operate at a higher duty cycle.

The measured performance data may be used to automatically and statistically calibrate a target performance value for determining whether the measured performance is degraded. A mechanism for regulating multiple background tasks such that the tasks also do not interfere with one another is further provided. An exemplary application using the present invention to operate in the background to find and merge duplicate files is also described.

Other advantages will become apparent from the following detailed description when taken in conjunction with the drawings, in which:

DETAILED DESCRIPTION OF THE INVENTION

Exemplary Operating Environment

Figure 1:
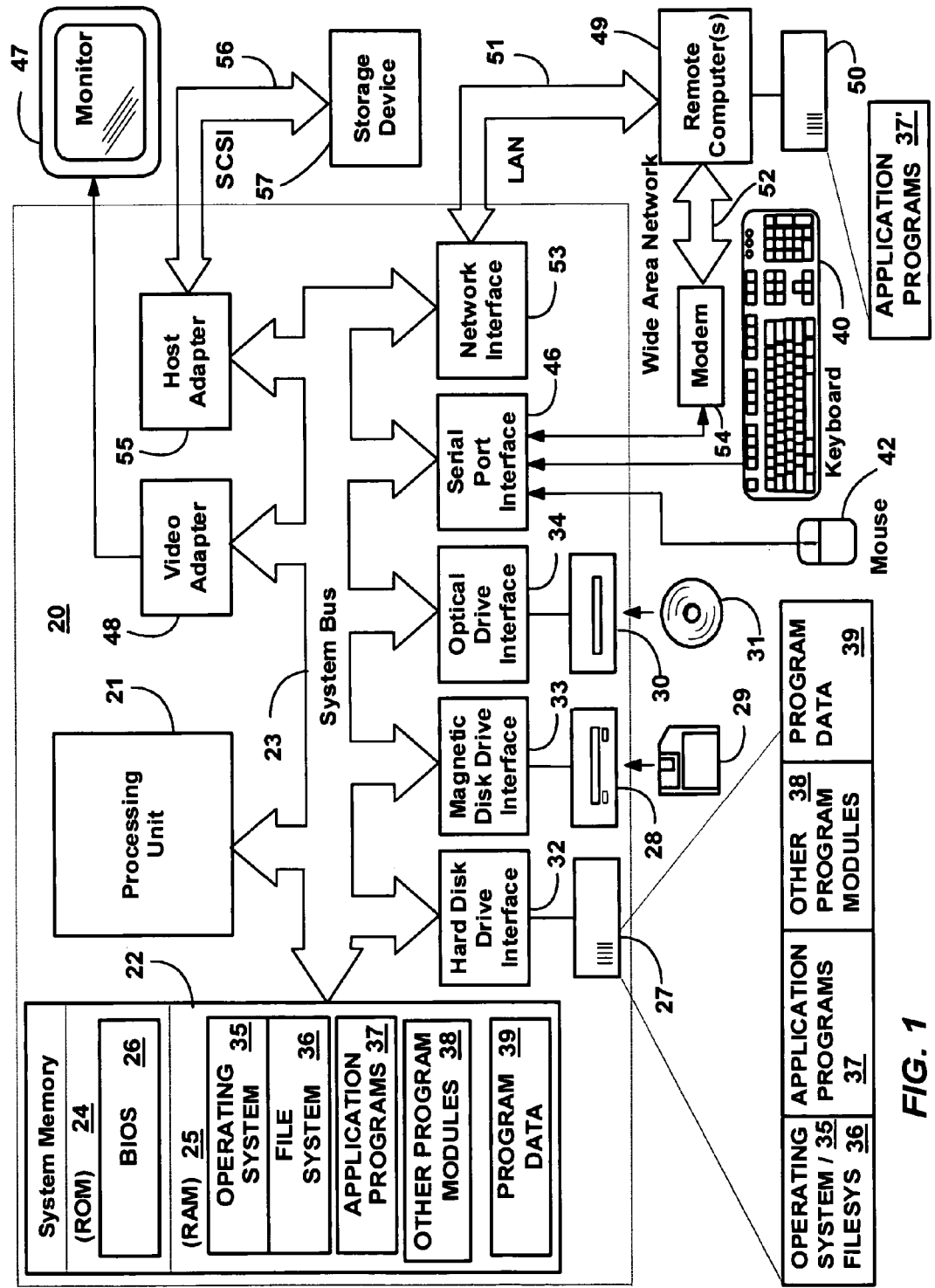
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Background Process—The SIS Groveler

The present invention will be described below with respect to an exemplary background process that performs file I/O operations. In particular, one such background process, known as a single instance store (SIS) groveler, is directed to scanning a file system volume for duplicate files that can be combined into a single instance representation thereof. A single instance store facility and the SIS groveler are described in more detail in the copending United States Patent applications respectively entitled, "Single Instance Store for File Systems" and "Method and System for Automatically Merging Files Into a Single Instance Store," assigned to the assignee of the present invention, filed concurrently herewith, and hereby incorporated by reference herein in their entireties. Notwithstanding, there is no intention to limit the present invention to any particular type of background process, nor to those that perform I/O operations, but rather, as will be understood, the present invention will have numerous uses and applications throughout computing in general.

Figure 2A:
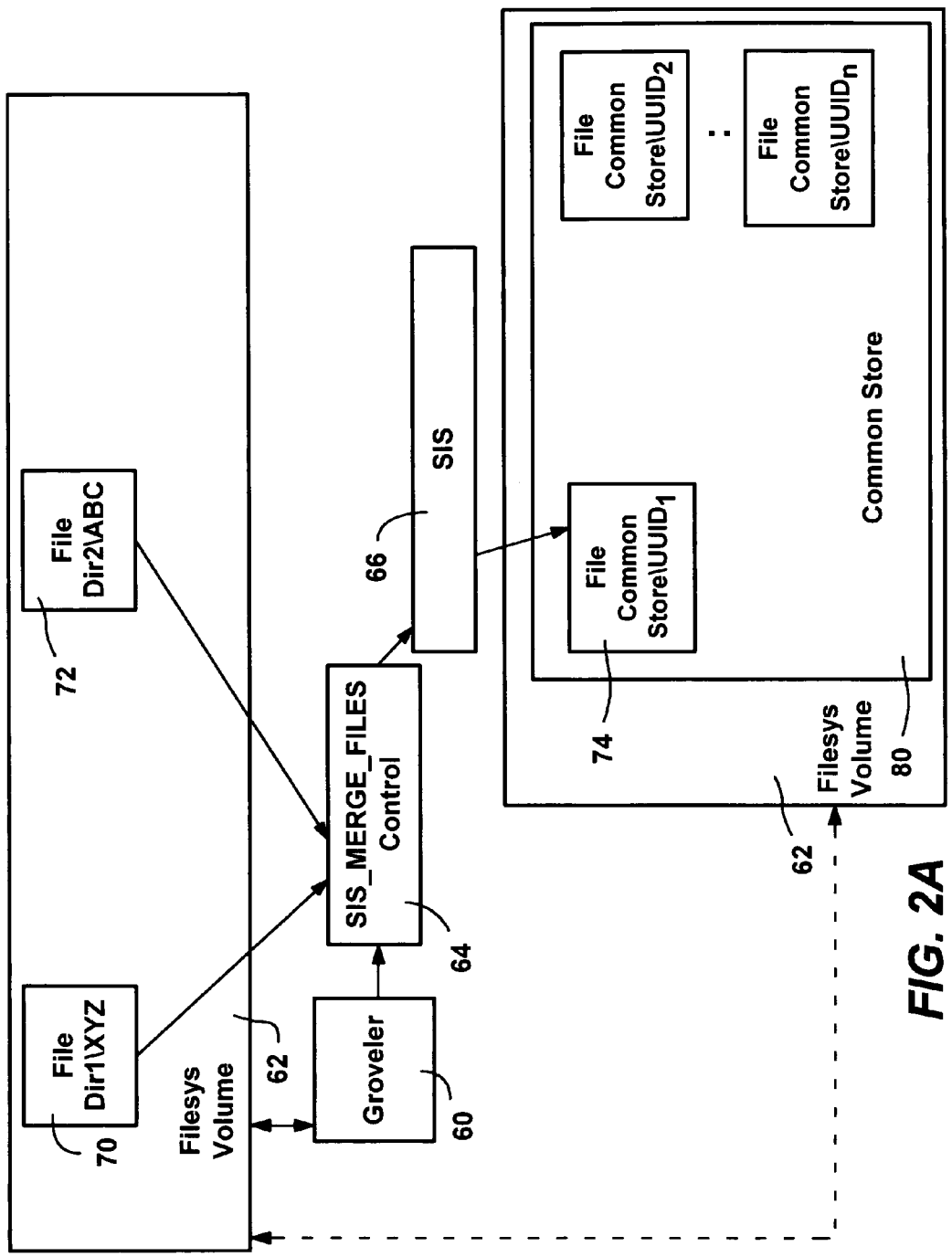
FIGS. 2A-2B are block diagrams representing an example of a background process (groveler) suitable for use with the present invention that automatically locates duplicate files of a file system volume for merging.
Figure 2B:
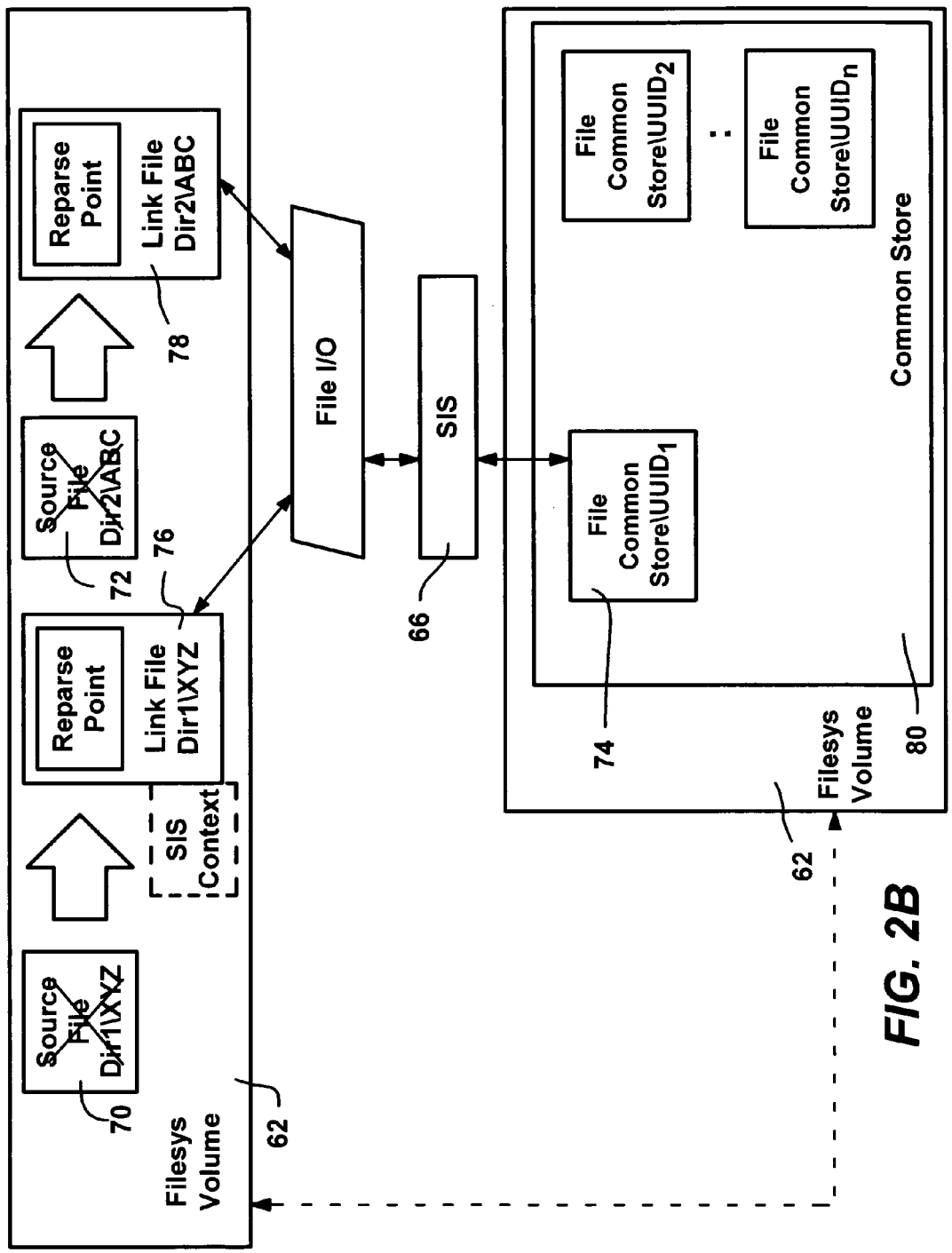

Turning now to FIGS. 2A-2B, there is shown a general concept of a groveler 60 and a single instance store (SIS) facility and architecture, which may be implemented in the computer system 20 and which may benefit from the present invention. As represented in FIG. 2A, in general, the groveler 60 runs as a background process to find files having duplicate data in a file system volume 62. Via a file system control named SIS_MERGE_FILES 64, the groveler 60 calls a Single Instance Store (SIS) facility 66 to merge the duplicate files into a single instance of data with links thereto.

By way of example, as shown in FIGS. 2A and 2B, the groveler 60 finds that files 70, 72 (named Dir1\XYZ and Dir2\ABC) have duplicate data. When such duplicate files 70, 72 are located, the groveler 60 calls the SIS facility 66 via the SIS_MERGE_FILES control request 64. The call to the SIS facility 66 normally results in a single instance representation 74 of the original files 70, 72 with links 76, 78 (FIG. 2B) thereto, each link corresponding to one of the original files, e.g., the user sees each link file as if it was the original file. The common store file 74 is maintained in a common store directory 80 of such files.

Each SIS link file 76, 78 is a user file that is managed by the SIS facility 66, while the common store 80 is preferably a file system directory that is not intended to be visible or accessible to:users. Ordinarily, the link files 76, 78 may be maintained on the same file system volume 62, as is the common store file 74 and the common store directory 80. To avoid a performance impact on other processes via pollution of the disk buffer cache, file reads by the groveler 60 are non-cached. To avoid interfering with foreground processes via file locking conflicts, opportunistic locks are used by the groveler 60 when accessing a file, which temporarily suspend access to the file by another process until the groveler 60 can release it.

Figure 3:
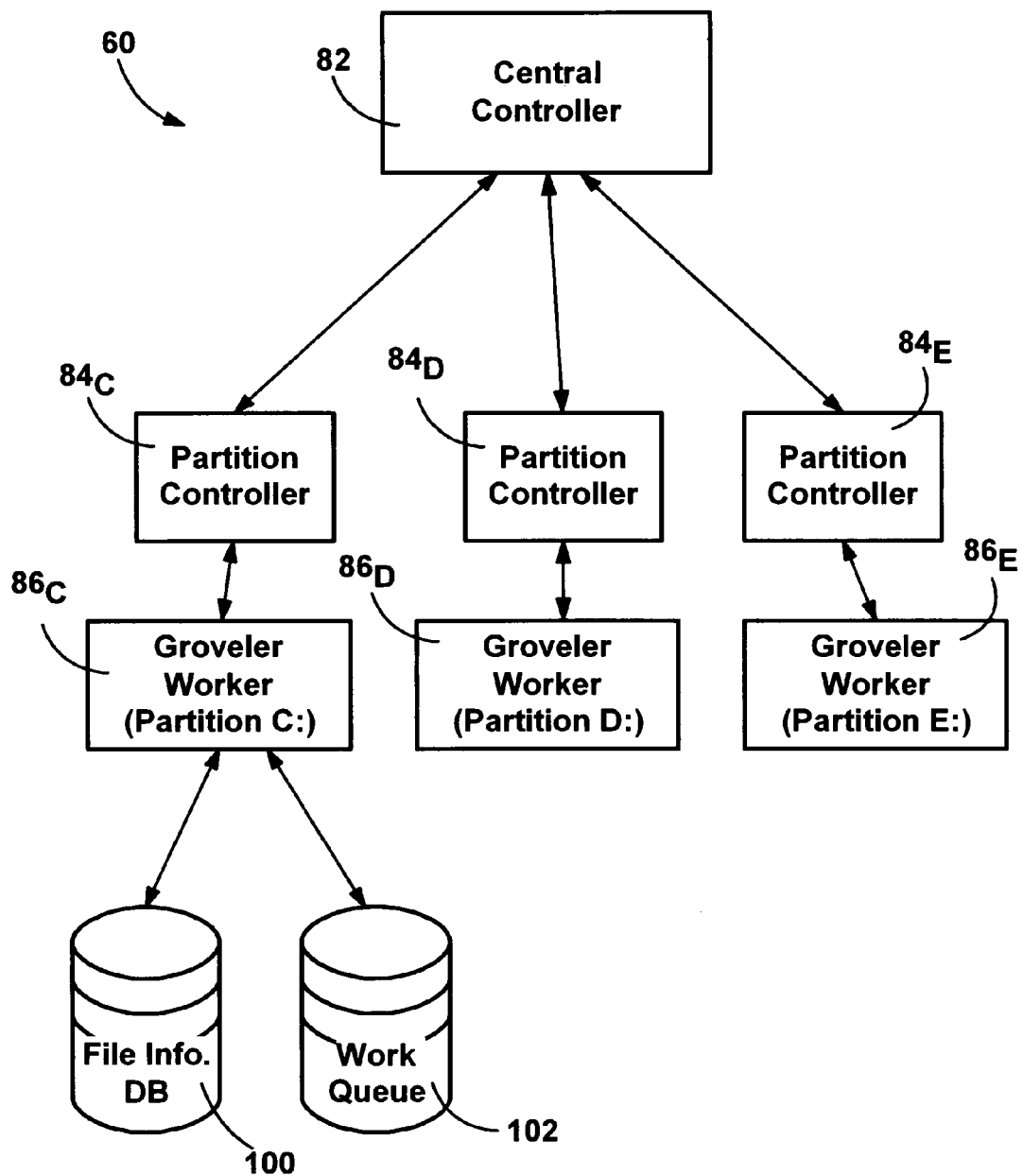
FIG. 3 is block diagram representing various components of the exemplary groveler background process.

As generally represented in FIG. 3, to accomplish detection of duplicate files for merging purposes, the groveler 60 includes a central controller 82, which regulates the operation of one or more partition controllers $84_C$-$84_E$, one partition controller per file system volume. In turn, the partition controllers $84_C$-$84_E$ each have a groveler worker $86_C$-$86_E$ associated therewith that when activated, individually attempt to locate duplicate files in their corresponding file system volume.

The central controller 82 synchronizes the operation of the partition controllers $84_C$-$84_E$ across multiple volumes, for example, such that only one runs at a time depending on available system resources. In turn, when allowed to operate, each partition controller $84_C$-$84_E$ calls functions of its corresponding groveler worker $86_C$-$86_E$. As described below, the central controller 82 determines which of the volumes are allowed to be groveled, and in conjunction with each partition controller 84, regulates how and when each groveler worker 86 is executed.

Figure 4:
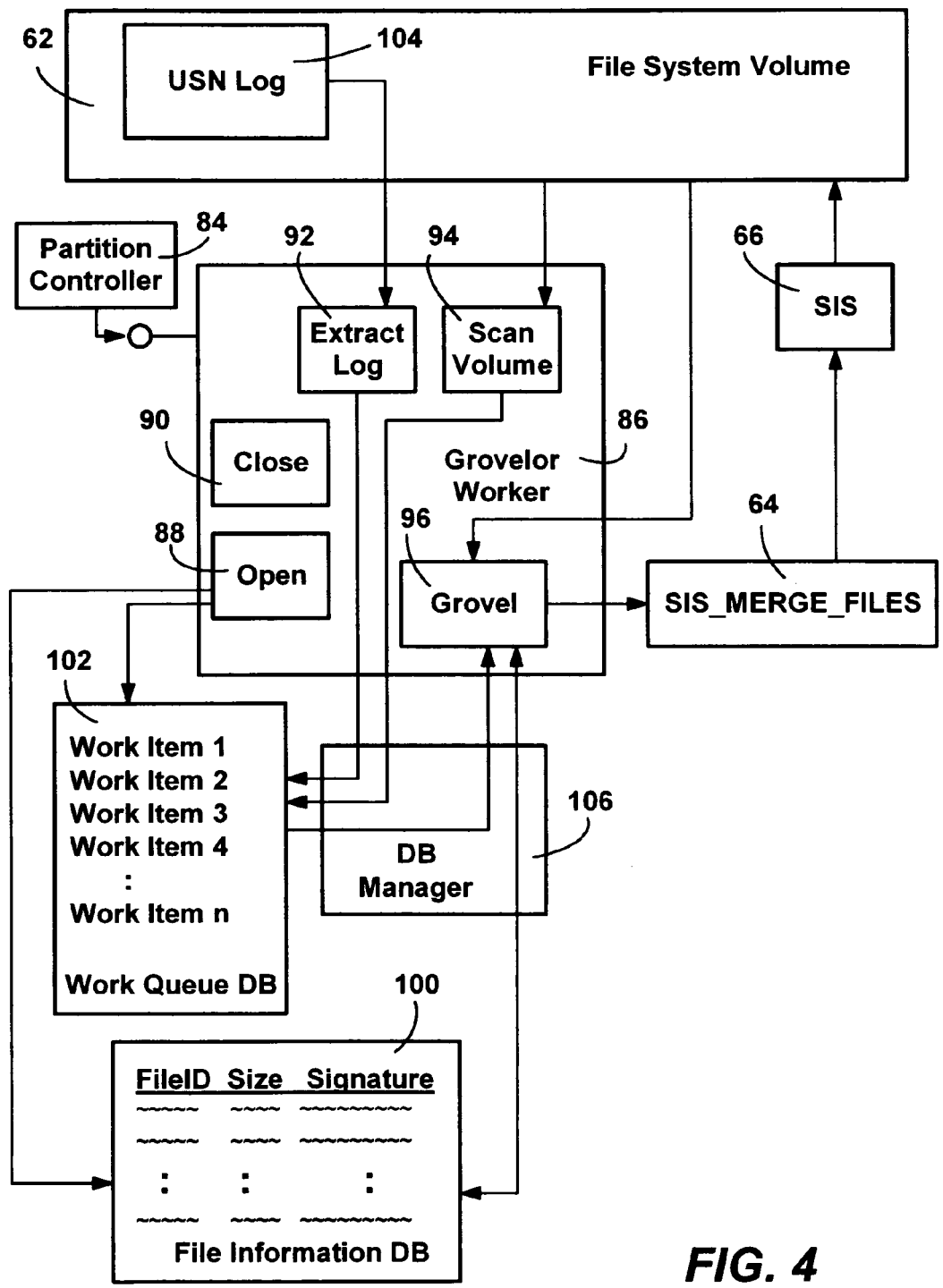
FIG. 4 is block diagram representing various components connected to a groveler worker object of FIG. 3.

As represented in FIG. 4, each groveler worker 86 is a single process, and includes an open function 88, close function 90, extract log function 92, scan volume function 94 and grovel function 96. In general, calling the open function 88 causes the groveler worker 64 to open (or create if needed) a database 100 of file information and a queue 102 of work items, also conveniently stored as a database. The close function 90 takes care of any cleanup operations before the groveler worker is shut down.

The extract log function 92 uses a USN (Update Sequence Number) log 104 to add items (file identifiers) to the work item queue 102. As is known, the USN log 104 dynamically records changes to a file system volume's files by storing change information indexed by a monotonically increasing sequence number, the USN. The extract log function 92 reads records from the USN log 104, each time starting from where it previously left off (as tracked by recording the USN), filters out those records that do not deal with new or modified files, and adds items to the work item queue 102 that correspond to new or modified files.

The extract log function 92 is called at a frequency that varies in an attempt to place a constant number of items in the work item queue 102 per call, and thus the frequency of calling the extract log function 92 is based on the amount of file system volume activity taking place. For example, if disk activity is at a high rate, a large number of USN records will be extracted from the USN log 104, whereby the extract log function 92 will likely add a larger number of items to the work item queue 102 relative to times of slow disk activity. By using the number of records extracted during the most recent extract log function call to determine the time duration before the next call, a high number of extracted records will cause a higher rate of calling extract log, while a lower number will cause a lower rate of calling. Over a period of time, the changes to the rate of calling roughly provide the desired number of items being placed in the work item queue 102 per call. Note that the rates may be adjusted gradually to smooth out any abrupt changes in disk activity.

The extract log function 92 records the last USN handled so that the extract log function 92 will begin at the correct location the next time it is called. As described above, the extract log function 92 returns a count of the USN entries extracted, from which the partition controller 84 calculates the next time to call the extract log function 92.

Calling the scan volume function 94 places work items (file identifiers corresponding to files in the volume) into the work item queue 102 via a depth first search of the file system volume 62. The scan volume function 94 is time limited, whereby when called, it places as many files as possible into the work item queue 102 within its allotted time, and resumes adding files from where it left off when called again. Note that the scan volume function 94 may be given some filtering capabilities, e.g., such that it will not add common store files to the work item queue 102, however at present the scan volume function 94 merely adds file identifiers as items to the work item queue 102 and any filtering is performed when work items are dequeued. The scan volume function 94 is called only when needed, e.g., when the work item queue 102 is first created, or if a problem occurs with the USN log 104 or the database 100, since under these circumstances the extract log function 92 may not be provided with the proper file change information.

The grovel function 96 removes items from the work item queue 102, and processes each removed item to determine if it meets some criteria, e.g., whether the file corresponding to that work item has a duplicate file in the volume 62. To this end, the grovel function 96 computes a checksum (signature) from the file's data, and queries the file information database 100 via a database manager 106 (including a query engine) to see if one or more files in the volume have the same checksum and file size. At the same time, the database manager 106 updates the file information database 100 as needed with the file information, e.g., adds new records or changes existing records by storing or modifying the file size and signature indexed by the file ID in the database 100. If at least one matching file is found, the grovel function 96 performs a byte-by-byte comparison with the matching file set to determine if one of the files is an exact duplicate, and if exact, calls the SIS facility 66 via the SIS_MERGE_FILES control 64 to merge the files. In this manner, duplicate files may be automatically located and combined in a rapid manner by the groveler background process 60.

Regulating Background Tasks

Figure 5:
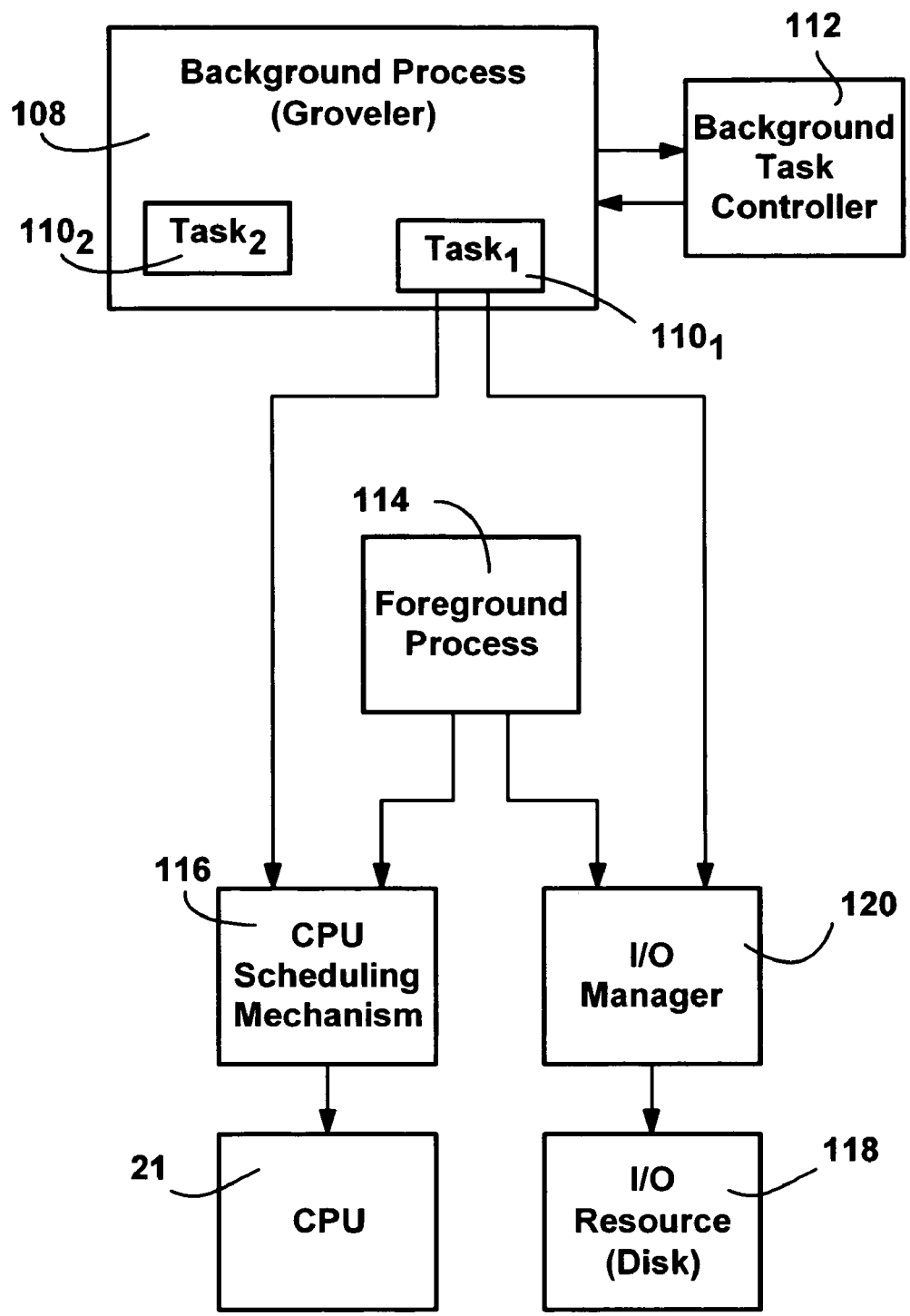
FIG. 5 is a block diagram representing a general architecture for controlling the operation of a background task in accordance with an aspect of the present invention.

Turning to an explanation of the present invention, FIG. 5 shows a general architecture wherein a background process 108 (e.g., a groveler) includes tasks $110_1$ and $110_2$, each of which is regulated by a background task controller 112 in a manner that substantially limits its interference with a foreground process 114. The architecture is made available as an application library that provides a programming interface to monitor and control background tasks. Note that the actual unit of execution that is regulated is a task, of which there may be more than one per process. For example, in the SIS groveler 60, there are two tasks per disk partition, an "extraction" task (the extract log function 92) for moving extracted entries from the USN log 104 to the work queue 102, and a "grovel" task for the other groveler functions (e.g., the scan volume function 94 and the grovel function 96).

Although a single task may include multiple threads in order to maintain multiple contexts, in one implementation, only one thread is permitted to proceed at a time, in order to prevent threads from interfering with each other's work measurements. For example, in the groveler 60, there is one thread for dequeuing and processing files in a partition, and another thread for traversing the directory tree and enqueuing files, but both threads comprise the single grovel task. Task execution alternates between the threads (as determined by the process) in an attempt to maintain an approximately constant work queue depth.

In accordance with one aspect of the present invention, the background task controller 112 controls the activity of a process by separately throttling each individual task of that process. To regulate the operation of the background tasks of a process, each task (e.g., $110_1$) waits for authorization to proceed from the background task controller 112. In general, the execution of each task is quantized into time slices, whereby each task is permitted to execute for a set period of real time. The authorization is given at a frequency that depends on a number of factors, including the performance of the background task, whether the task is considered critical, and so on, as described below. A task may be given any CPU scheduling priority allowed by the system, e.g., normal priority, but may be throttled by the present invention by only allowing the task to operate for limited time slices at a low frequency relative to how often a foreground process is able to request CPU cycles. A task may also be given a reduced CPU scheduling priority, whereby the CPU scheduling mechanism 116 will further control the cycles given to the background task 1101. As represented in FIG. 5, the background task 1101 may be thus limited in how often it is given access to the CPU 21 and/or how often it obtains access to an I/O resource 118 (e.g., a disk via an I/O manager 120).

Figure 6:
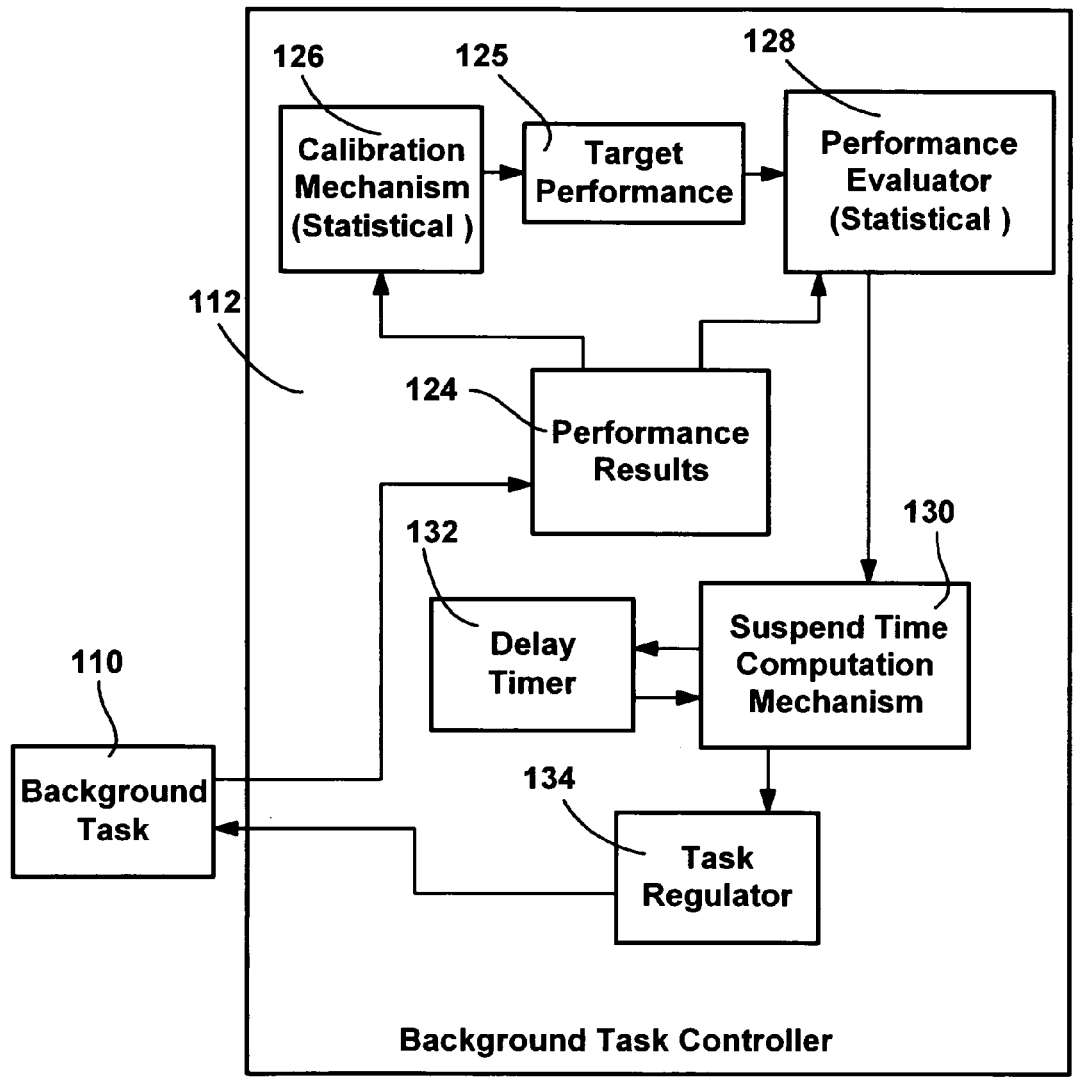
FIG. 6 is a block diagram generally representing components for regulating a background task in accordance with an aspect of the present invention.

In accordance with another aspect of the present invention, to regulate a background task 110 by determining when it is permitted to execute, the background task controller 112 receives and analyzes performance results 124 (FIG. 6) from the background task 110, i.e., the progress or progress rate thereof, (e.g., amount of work performed per unit time). Based on these performance results with respect to a target performance amount 125, the background task controller 112 evaluates the work performed by the most recent background task, and computes a time for suspending the background process to limit its interference with the foreground process 114. The background task controller 112 also uses the measured work performance 124 to statistically calibrate the target value for future comparisons. These functions of the background task controller 112 are generally represented in FIG. 6 as components including a calibration mechanism 126, performance evaluator 128 and suspension time computation mechanism 130. After a delay timer 132 (e.g., a blocking mechanism) delays for the calculated suspension time, a task regulator component 134 authorizes the background task 110 to again proceed, whereby new performance results are obtained, analyzed and used to determine a new suspension time for the next authorization of the background task. This repeats as long as the background process has a task to perform.

Figure 7:
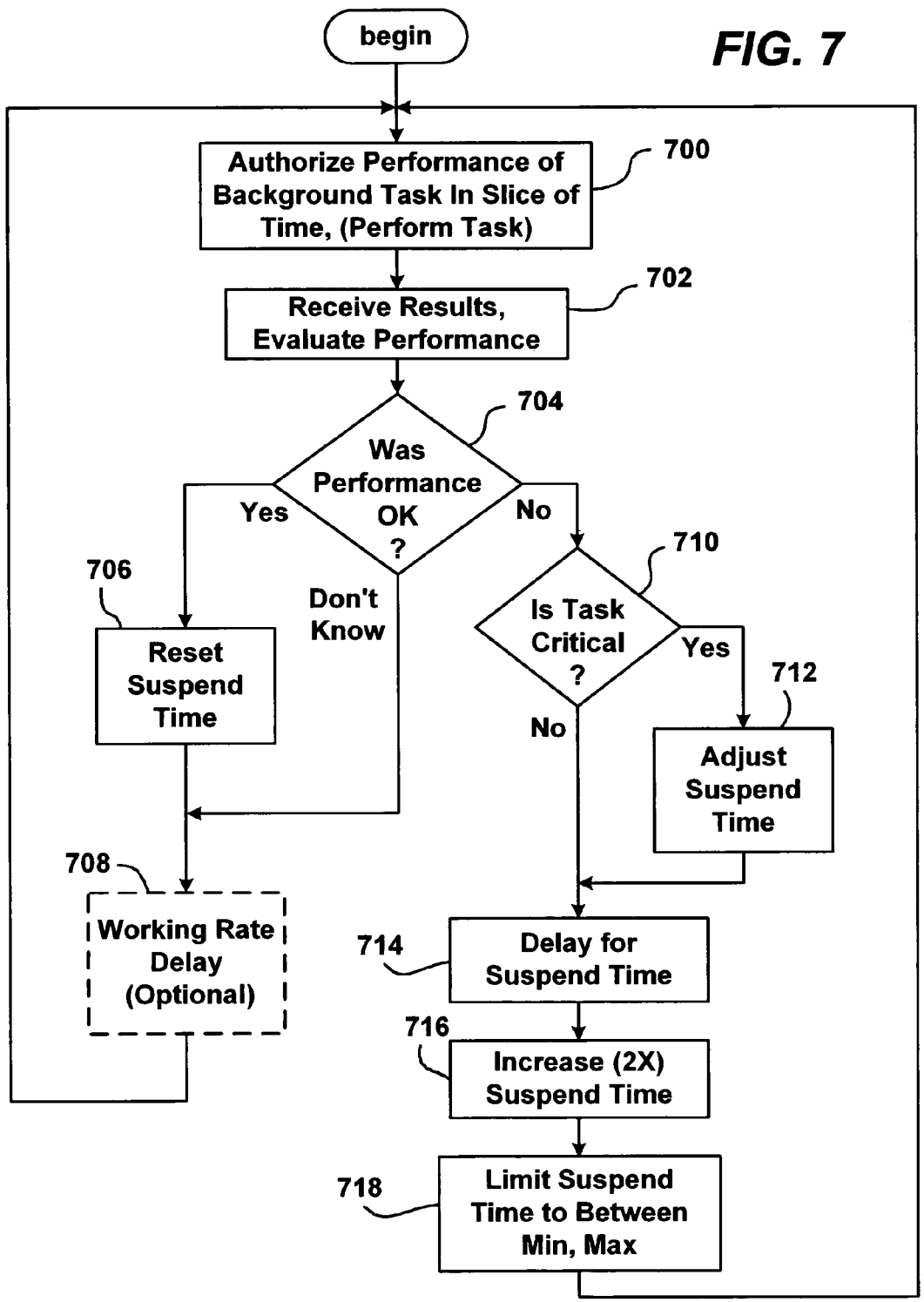
FIG. 7 is a flow diagram generally representing the steps taken to determine the operation of a background task in accordance with an aspect of the present invention.

FIG. 7 represents the general steps taken to calculate the suspension time, beginning at step 700 which represents the background task first being authorized and executed. At step 702, the actual progress, measured as an amount of work per unit time is evaluated by analyzing the received performance results 124 against the target performance (target progress) amount 125. As described in more detail below, the progress (overall performance) is evaluated based on the number of operations performed, the total time taken for those operations, and the relative amount of work performed by each operation. As also described below, statistics are employed in the evaluation to deal with fluctuations in performance measurements, whereby the performance evaluator 128 returns either OK performance, not OK performance, or unknown at this time, (i.e., needs more information). In general, if performance (progress) is good, then it is likely that the background task 110 was not contending with any foreground process, and thus can continue its operations. Conversely, if performance was poor, contention is suspected, and thus the background task is suspended (backed off) by increasing the time between its authorizations to proceed until either performance improves or some upper limit is reached.

As shown via step 704, if the performance was acceptable (or better) with respect to the target performance 125, step 704 branches to step 706 where the suspension time is reset to some minimum. Note that when a throttled task's performance has returned within an acceptable target range, the throttling is removed by resetting the suspension time for the task to an initial, minimum value. Step 708 provides an optional, (represented by the dashed box), working rate delay so that the background task 110 is not called too quickly, possibly reducing performance elsewhere in the system. Step 708 returns to step 700 to again authorize performance of the task following this working rate delay.

If at step 704 the statistically-based evaluation mechanism 128 does not yet have enough information to gauge performance, step 704 branches around step 706 to step 708. Since more information is needed by the evaluation mechanism, the task is permitted to proceed for another time slice, but the suspension time is left at its current value.

If at step 704 the performance was too low, step 704 branches to step 710 where a determination is made as to the importance of the background task. Important tasks may be analyzed against any appropriate criteria to determine when they should be treated as exceptions, whereby the task may become more aggressive by reducing the suspension time and increasing its duty cycle. For example, the SIS groveler 60, which reclaims space by merging files, may be deemed critical as space begins to run low on a file system volume, such as below some threshold percentage. For regulated tasks of the groveler 60, step 710 thus may include (at least occasionally) a check of the volume's free space. If a background task is deemed critical, the time between task operations may be adjusted (e.g., shortened) by step 712 as the relative importance of that background task changes, regardless of its level of interference with any foreground processes. For example, as the limit on the free disk space approaches zero, the task suspension time approaches the working delay interval.

If at step 710 the task is not important enough to be an exception, step 714 delays the task for the current suspension time. If at step 710 the task is important enough to be an exception, step 712 adjusts the suspension time by reducing it before step 714 delays the task for the suspension time. After the delay at step 714, the suspension time is increased at step 716.

In one implementation, when poor performance is computed, the suspension time is doubled from its previous value, providing an exponential back off to quickly reduce its interference with a resource-contending foreground process. The exponential increase, in combination with the reset when normal, makes the background task adjust to the time scale of the foreground execution patterns, providing relatively fast background process resumption following short periods of foreground activity, but limiting the impact of the background task's execution during long periods of foreground activity.

Step 718 adjusts the suspension time to ensure that it is between some maximum and minimum value, e.g., if zero, doubling the time would have no effect, and if too long, the background task controller 112 would not be effective in detecting when the resource contention situation has improved. For example, the lower limit on time between the slices of execution would be set to some minimum level (as described below), while the upper limit would bound the worst-case background task resumption time (as also described below). As described above, step 714 represents delaying for the suspension time, which when complete, enables the background task controller 112 to loop back to step 700 to again authorize the background task to proceed.

Note that it is not necessary for all tasks of a background process to be throttled. For example, any task that primarily contends for the CPU may be sufficiently executed in the background by the existing CPU scheduling priority mechanism 116. Alternatively, if a task executes with a very low duty cycle, then the impact of that task on other processes may be very small, even if the task is I/O intensive during its active periods. For example, in the SIS groveler process 60, the extraction task 92 which extracts USN entries and queues them into the work item queue 102 is not throttled, since suspending it could cause missed file updates, whereby the groveler would have to rescan the entire volume. Instead, as described above, the groveler partition controller dynamically adjusts the execution frequency of the extract function 92 to attempt to maintain a fixed count of extracted USN entries per work queue update. This means that the duty cycle of the extraction task increases with disk activity, however even during periods of heavy disk activity this duty cycle has been measured at under two percent, which is deemed acceptable behavior.

As described above, when a task completes a slice of execution, the task reports back a set of performance data indicating the measured speed of its operations. However, the speed of a task may be highly variable, e.g., I/O times may vary widely even on an unloaded system, and clock granularity introduces errors in performance measurements. To overcome these fluctuations in performance measurements, the task controller 112 includes a statistical technique in the performance evaluator 128.

To this end, each task reports its performance data (progress) as a list of three components, i.e., triples, each parameter corresponding to a type of operation performed by the task. Each triple includes a count of the number of operations performed during the time slice, the total real time taken for the operations to complete and an operational parameter that represents the relative amount of work performed by each operation. The set of operations for each task is statically established prior to the regulated execution of the task, and operations may be common across tasks. In general, an operation may be any action or set of actions that consumes a sufficient amount of real time to be readily measurable. Operations that are CPU-intensive will exhibit performance that is sensitive to contention for processor cycles and processor cache, operations that are memory-intensive will exhibit performance that is sensitive to contention for memory capacity and memory bandwidth, and so forth. For example, in the SIS groveler 60, the performance of the process is primarily disk reads, whereby "disk reads" is the type of operation and the parameter is the amount of data read. Note that neither the background task controller 112 nor the process 108 needs to know the resources being used by an operation.

For each operation type, the operation time is computed as the total consumed time divided by the operation counts. The resulting operation time value is then compared against the target value (described below) using a paired-sample sign test, a known (Fruend, J. E., *Mathematical Statistics*, Fifth Edition, Prentice Hall, 1992) distribution-free, non-parametric statistical comparison test. The paired-sample sign test enables the measurements from multiple operations to be combined into a single statistical test. More particularly, the paired-sample sign test compares each sample with a corresponding target value and counts the total number of samples that are greater than their target values. Each target value is a function of the operation type and the optional work parameter. The sample size increases linearly with each test, up to a set limit to bound the computational and storage requirements of the test, thereby taking advantage of more information as it becomes available.

The result of the comparisons may be expressed as an ordered pair (n, r), where n is the sample set size and r is the count of samples that are greater than the target value. If r is greater than a threshold value that is a function of both n and a predefined (type-I) error probability $\alpha$, then the performance is judged to be degraded, whereby the suspend time is doubled up to an upper limit as described above. If r is less than a threshold value that is a function of both n and a predefined (type-II) error probability $\beta$, then the performance is judged to be normal, and the suspend time reset. If r falls between the two threshold values, then the performance judgement is deferred, i.e., the performance evaluator returns its "do not know/need more information" result whereby the current suspend time is maintained at its previous value, as also described above.

A task is thus regulated based on whether its actual, measured performance is normal or degraded relative to a target value. A target value for a task may be manually determined, e.g., by empirically testing one or more samples when a machine is not loaded to determine a reasonable target performance for a task, and then using that target in the comparison with the actual performance.

However, an improved way in which to obtain and maintain a target value is to perform an automatic calibration procedure using the same measured performance data used in the comparison by the performance evaluator 128. To obtain a better representative target value 125, the actual values are conditionally sub-sampled, statistically abstracted and temporally filtered as described below.

For operations that perform a constant amount of work, the measure of the target performance is a quiescent operation time, which is the time to perform the operation on an unloaded resource. For operations that perform a variable amount of work, the time to perform each operation is assumed to correlate linearly with the quantity of work completed, such that the measure of the target performance is essentially a line that represents the quiescent operation time as a function of the work parameter.

Statistical abstraction produces a quantified measure of the target performance from the sampled performance measurements. This measurement is a linear equation that relates the operation time to a work parameter. The coefficients of the equation are obtained through least-squares linear regression, where the variable x is the work parameter, and the dependent variable y is the operation time. The six sufficient statistics for linear regression, $\Sigma_x$, $\Sigma_y$, $\Sigma_{xx}$, $\Sigma_{yy}$, $\Sigma_{xy}$, and n are maintained persistently, whereby the performance target is not recalculated from scratch each time the process is executed.

The quiescent performance of an operation may change over time, e.g., the performance characteristics of file systems change as successive iterations of writes cause files to fragment. Temporal filtering may be used to age out older performance data so that throttling decisions are not made based on stale data. Each time a sample is taken, the sufficient statistics are updated according to the following rules:

$$\Sigma_x \leftarrow \xi \cdot \Sigma_x + x$$

$$\Sigma_y \leftarrow \xi \cdot \Sigma_y + y$$

$$\Sigma_{xx} \leftarrow \xi \cdot \Sigma_{xx} + x^2$$

$$\Sigma_{yy} \leftarrow \xi \cdot \Sigma_{yy} + y^2$$

$$\Sigma_{xy} \leftarrow \xi \cdot \Sigma_{xy} + x \cdot y$$

$$n \leftarrow \xi \cdot n + 1$$

wherein when $\xi$ is strictly between zero and one (i.e., not including the endpoints of zero and one), these rules effect an exponential averaging of the regression state. The determination of $\xi$ is described below.

Repeated application of the exponential-averaging update rule for n will cause it to asymptotically approach a constant value n' given by the following equation:

$$n' = 1/(1-\xi)$$

As a result, the effective steady-state sample size is n'. To initialize the regression, the calibration mechanism collects some number n" of samples, weights them by the ratio n'/n", and calculates the sufficient statistics with $\xi=1$. Since the background task controller 112 has no target performance values until after these n" samples are collected, the background task controller 112 does not attempt to dynamically regulate the execution of the task during this initialization phase. Instead, the background task controller 112 allows the task to execute at a special calibration rate that is both lower than the normal working rate, so as to reduce the performance impact of the task on the system, and higher than the suspension rate so as to complete the initialization phase within a reasonable period of time.

The exponential averaging of target performance is clocked by the rate at which samples are taken, rather than by the passage of time. Since measurements of degraded performance cause execution to back off, fewer such measurements will be made per unit time than will measurements of normal performance. Thus this mechanism will tend to capture values that reflect normal performance in preference to those that reflected degraded performance. However as described above, the execution rate of a task also increases as its work becomes more critical, even if its performance is degraded. Under these circumstances, the measurement data may be sub-sampled so as to consider only the number of samples that would have been taken if the maximum suspension rate had not been reduced.

Since the lack of target performance data is essentially what prevents the background task controller 112 from throttling a task during initial calibration, the completion of the initial data collection is sufficient to allow throttling to begin. However, there is no guarantee that the initial performance measurements were made during a time of relatively low system activity, so it is possible that subsequent performance that appears normal, by virtue of a comparison to the initially calibrated target, is actually degraded, whereby the background task controller 112 will fail to properly throttle the task. However, calibrating over a longer time increases the likelihood of encountering an idle period so as to obtain accurate measurements of quiescent performance. A probationary period may thus follow the initialization phase, during which the execution rate is permitted to drop as low as the suspension rate when the performance is judged to be degraded, but is not permitted to exceed the calibration rate even when the performance is judged to be normal, since the normal judgment is suspect at this time.

As described above, several parameters control various aspects of background task execution. It is relatively straightforward to determine appropriate values for these parameters from desired properties of the background process. For example, each task may determine the length of its own execution time slice. By shortening the time slice, the task increases the promptness with which it can be suspended, however the process needs to be long enough to efficiently amortize the overhead of the throttling mechanism. Tasks that perform operations with relatively long completion times will require longer time slices, e.g., in the SIS groveler 60, time slices for the groveling task are on the order of 200 milliseconds. The working rate defaults to unity, however this may be increased to limit the maximum possible performance interference of the background task on a foreground process.

The minimum suspend time is five seconds, but using a larger value delays the task longer before retrying, for more conservative behavior, while shorter delays permit a more rapid resumption of a task execution following a falsely triggered suspension. The maximum suspend time is five minutes, which keeps the impact below one-percent for the time-slice durations of most processes. As is understood from above, smaller values for the maximum suspend time reduce the worst case time, while larger values reduce the impact on foreground processes.

The steady-state calibration sample size n' and the initial calibration sample size n" are set to smooth out short-term variations in operation performance. The n' sample size value is used to calculate $\xi$ (by inverting the above equation for n', yielding $\xi=1-1/n'$), and thus also determines the time constants of the calibration system. Performance measurements that indicate normal performance will be sampled at the working rate, whereby multiplying n' by the time slice duration yields the time constant for improved performance. The time constant for deteriorated performance is greater than this in proportion to the ratio of the suspension rate to the working rate. For the SIS groveler example, n' is set to 5000 and n" is set to 1000, which for the 200-millisecond time slice and 5-minute maximum suspension time yield a performance increase time constant of 17 minutes and a performance decrease time constant of 17 days. Although the latter appears large, it is reasonable if no substantial and sustained decrease in disk performance is expected over a shorter period.

The calibration rate is generally set to a value between the suspension rate and the normal working rate. The higher the rate, the 'sooner the system will collect enough measurement samples to begin regulated execution. The lower the rate, the lower the performance impact on any foreground processes that may be running during target initialization. The default value is one time slice of execution per second, which for a 200-millisecond time slice limits the duty cycle of the background tasks to twenty percent. For an n" of 1000, this calibration rate will initialize the target performance in 3.3 minutes. The probation period may be set to virtually any duration, including zero, however a shorter period increases the danger of a negative impact on system performance due to an incorrectly calibrated target, whereas a longer period postpones the start of working at the maximal rate. The default-value for this parameter has been chosen at twenty-four hours, so as to include any comparatively quiescent periods in a diurnally cyclical load.

The task duty cycle constant determines the period over which weighted fairness among tasks is maintained. By default, this value is set to five minutes to coincide with the default value of the maximum suspension time.

The two error probabilities ($\alpha$ and $\beta$) that govern the sensitivity of the statistical comparison test are basically determined from three competing considerations. Increasing the value of $\alpha$ allows faster reaction to degraded performance, increasing $\beta$ relative to $\alpha$ improves the stability of background execution, and decreasing $\beta$ reduces the performance impact on foreground processes. A minimum number of samples is collected before degraded performance can be recognized by the paired-sample sign test. This minimum sample size increases with decreasing values of $\alpha$. For the paired-sample sign test, the relationship between $\alpha$ and minimum sample size m is quantized negative logarithmic:

$$[m = -\log_2 \alpha]$$

Therefore, a minimum of m performance measurements is made before the performance can be judged to be degraded and the background task thereby suspended. Since it is desirable to suspend the performance relatively quickly when interference with a foreground process is detected, m should be small, and accordingly $\alpha$ should be large.

By definition, $\alpha$ is the probability that the normal performance will be judged incorrectly to be degraded. At the extreme value of $\alpha=1$, the performance is always judged to be degraded, irrespective of any measurement. As described above, the suspension time grows exponentially with each judgement of degradation, and is reset to its initial value when judged normal. In other words, during times of normal performance, the tasks suspension state is a birth-death system that is isomorphic to a bulk-service queue (L. Kleinrock, *Queuing Systems Volume 1: Theory*, John Wiley and Sons, (1975)) of infinite group size with an arrival rate of $\alpha$ and a bulk service rate of $\beta$. Therefore, under an assumption that timing measurements exhibit no low-order serial correlation apart from that due to load, the steady-state probability that exactly k judgements of degradation have occurred since the most recent judgement of normalcy is given by:

$$p_k = [\beta/(\beta+\alpha)][\alpha/(\alpha+\beta)]^k$$

When the next judgement of degradation occurs, which it will after a minimum of m time slices with a probability of $\alpha$, the suspension time will be $2^k$ times the base suspension time d, where d is expressed as a multiple of the task's mean time slice. Thus, the mean steady-state inactive time relative to the working time is:

$$q = \sum_{k=0}^{\infty} \alpha 2^k dm^{-1} p_k = (d/m) [\alpha\beta/(\beta-\alpha)]$$

As can be appreciated from the above formula, $\alpha$ needs to be less than $\beta$ for this system to be stable. Increasing $\beta$ relative to $\alpha$ increases the duty cycle of the background task during periods without foreground activity. Values for $\alpha$ and $\beta$ have been selected as $\alpha=0.05$ and $\beta=0.2$, whereby m=5 and a 200-millisecond time slice yields a minimum reaction time of one (1) second. A base suspension time of five (5) seconds makes d=25, giving a background performance penalty of q=0.33. Tested empirically, these values provide a relatively prompt reaction to foreground activity, a moderately stable background state, and a fairly low impact on foreground processing in the presence of highly stochastic operation timing.

Turning to another consideration of the present invention, a single process may include more than one background task. However, if multiple tasks use a common resource, then the operation of one task may interfere with the performance of another task, leading the other task to incorrectly suspend its operation. This may lead to unfair measurements, instability, and moreover, two or more background tasks may mutually interfere in a manner that forces each other into their maximally suspended states, even at times when there are no foreground processes in execution.

The background task controller 112 lets only one task execute at a time to overcome the problems with multiple tasks. To determine which task to run, relative priorities are established for the tasks, and each task provides a value that indicates its current priority, referred to as its instantaneous task priority. The background task controller 112 uses the instantaneous task priority to calculate an effective task priority using the following formula:

$$\text{effective task priority} = \text{instantaneous task priority} \cdot (\text{task duty cycle} + \varepsilon)$$

where the task duty cycle is calculated as the fraction of recent real time that the task has been permitted to execute, exponentially averaged over a period determined by a settable time constant. The $\varepsilon$ variable is a small positive value, ensuring that only a zero instantaneous task priority yields a zero effective task priority. The task having the smallest value for its effective task priority from among those tasks that are ready to execute is the task that is permitted to execute next. Each task is thus permitted to execute for a portion of real time that is inversely proportional to the value of its instantaneous task priority.

Task priority is only relevant when two or more tasks are ready to execute at the same time, and thus tasks that are throttled or that have naturally low duty cycles do not significantly interfere with other tasks, even when such tasks have relatively high priorities. Tasks need to set their instantaneous task priorities so that they do not execute too frequently and prevent other tasks from executing.

By way of example, each groveling task of the SIS groveler 60 calculates its priority according to the following formula:

$$\text{instantaneous task priority} = \text{partition's disk free space}/\text{total free disk space} + \varepsilon$$

where $\varepsilon$ is a small constant.

As a result, each groveling task has a duty cycle that is inversely proportional to its partition's share of the total free disk space in the system. At an extreme, a partition with no free disk space has a groveling task with an instantaneous task priority of $\varepsilon$, whereby it has a higher priority than other tasks except those with a zero instantaneous task priority.

Note that the above mechanism is directed to background tasks within a process, but may be extended to apply to background tasks within separate processes. Although there is no adequate way for a process to know when it is more important than another process, the process may inform the system when it is less important than usual. A process may set an instantaneous process priority, (where one is normal, zero is minimal), whereby the background task controller calculates an effective process priority using the following formula:

$$\text{effective process priority} = \text{instantaneous process priority} \cdot (1 - \text{process duty cycle})$$

where the process duty cycle is analogous to the task duty cycle described above, exponentially averaging the fraction of recent real time that the process has been permitted to execute. Of those processes that are ready to execute a task, the one having the highest effective process priority is permitted to execute next, whereby each normal-priority process will be granted an equal share of real time in which to execute. Lower priority processes will receive proportionally reduced shares of execution time.

As can be seen from the foregoing detailed description, there is provided a method and system that regulate a background process based on actual performance measurements. The method and system enable the background process to execute, yet in a manner that limits its interference with a foreground process, even when the limiting resource that is causing the interference is not the CPU.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment, having a computing system comprising a processor executing a background task, the computing system performing a method, comprising:
   evaluating the performance of the background task relative to a target performance of the background task, the target performance including a target value indicative of a target amount of work for the background task to perform, by at least comparing a measured value of the amount of work performed by the background task against the target value; and
   (i) if the performance is acceptable, resetting a suspend time for delaying execution of the background task to a predefined starting value that is between zero and a maximum value, and returning to executing the background task;
   (ii) if the performance is not acceptable:
   (1) delaying execution of the background task for the suspend time;
   (2) after delaying for the suspend time, increasing the suspend time;
   (3) ensuring that the increased suspend time is at least a minimum value that is greater than zero, and no more than the maximum value;
   (4) determining whether the background task is critical, and if so, adjusting the suspend time before delaying for the suspend time; and
   returning to executing the background task.

2. The method of claim 1, wherein the target value is based on empirical testing and a plurality of statistical samplings relative to a required time to perform an operation corresponding to the background task on an unloaded resource.

3. The method of claim 2, wherein if the performance is not determined by current performance data, the maintaining suspend time and returning to executing the background task.

4. The method of claim 1, further comprising, when the performance is acceptable, delaying for a working rate delay time before returning to executing the background task.

5. The method of claim 1, wherein evaluating the performance of the background task includes statistically combining current measured data with previous measured data.

6. The method of claim 1, wherein the background task is executed for a limited time, and wherein evaluating the performance of the background task includes evaluating a count of a number of operations performed during the limited time.

7. The method of claim 6, wherein the background task is executed for a limited time, and wherein evaluating the performance of the background task includes evaluating a total real time taken for the operations to complete.

8. At least one computer-readable storage medium having computer-executable instructions, which when executed, perform the method of claim 1.

9. The method of claim 1, wherein the target performance is a user defined and manually entered value.

10. The method of claim 1, wherein the target performance is based on past performance data of the background task.

11. The method of claim 1, wherein increasing the suspend time comprises increasing the suspend time exponentially.

12. In a computing environment, a computing system comprising:
   a processor;
   a task regulator comprising software code that authorizes execution of a task of a background process;
   a performance evaluator comprising software code that compares a measured progress of the task against past performance data of the background task to provide progress information;
   a computation mechanism comprising software code coupled to the performance evaluator to receive the progress information, and further coupled to the task regulator to control subsequent authorization of the background task based on the progress information, and storage media storing computer-executable instructions, which when executed, implement the method recited in claim 1.

13. The computing system of claim 12, wherein the measured progress of the task corresponds to an amount of work per unit time performed by the task.

14. The computing system of claim 12, wherein the progress information comprises a suspension time.

15. The computing system of claim 14, wherein the computation mechanism determines the suspension time based at least in part on whether or not the task is critical.

16. The computing system of claim 14, wherein the computation mechanism determines the suspension time based at least in part on a previous suspension time.

17. The computing system of claim 12, further comprising a calibration mechanism that receives the measured progress data and statistically combines the measured progress data with the performance data.

18. The computing system of claim 12, wherein the task of the background process executes for a limited time, and wherein the measured progress data include a count of a number of operations performed during the limited time and a total real time taken for the operations to complete.

19. The computing system of claim 12, wherein increasing the maximum value represents a worst-case background task resumption time.

\* \* \* \* \*